(12) United States Patent
Beard

(10) Patent No.: US 12,496,974 B2
(45) Date of Patent: *Dec. 16, 2025

(54) MOBILE REFUELING VESSEL

(71) Applicant: BNJ Leasing Inc, Mt. Pleasant, MI (US)

(72) Inventor: Mark William Beard, Mt. Pleasant, MI (US)

(73) Assignee: BNJ Leasing Inc, Mt. Pleasant, MI (US)

( * ) Notice: Subject to any disclaimer, the term of this patent is extended or adjusted under 35 U.S.C. 154(b) by 925 days.

This patent is subject to a terminal disclaimer.

(21) Appl. No.: 17/688,239

(22) Filed: Mar. 7, 2022

(65) Prior Publication Data
US 2022/0185188 A1    Jun. 16, 2022

Related U.S. Application Data

(60) Continuation of application No. 16/356,467, filed on Mar. 18, 2019, now Pat. No. 11,267,403, which is a continuation of application No. 15/871,553, filed on Jan. 15, 2018, now Pat. No. 10,232,782, which is a division of application No. 14/629,889, filed on Feb. 24, 2015, now Pat. No. 9,931,986.

(51) Int. Cl.
*B60R 3/00* (2006.01)
*B60P 3/22* (2006.01)
*B60R 3/02* (2006.01)

(52) U.S. Cl.
CPC ............ *B60R 3/007* (2013.01); *B60P 3/2215* (2013.01); *B60P 3/2245* (2013.01); *B60R 3/005* (2013.01); *B60R 3/02* (2013.01)

(58) Field of Classification Search
CPC ..... B60R 3/007; B60R 3/2215; B60R 3/2245; B60R 3/005; B60R 3/02
USPC ........................................................ 280/837
See application file for complete search history.

(56) References Cited

U.S. PATENT DOCUMENTS

| | | |
|---|---|---|
| 1,816,028 A | 7/1931 | Thwaits |
| 2,035,537 A | 3/1936 | Cowan et al. |
| 2,563,372 A | 8/1951 | Risse |
| 2,798,652 A | 7/1957 | Easton |
| 3,266,675 A | 8/1966 | Willis |
| 3,315,978 A | 4/1967 | Chieger et al. |
| 3,800,912 A | 4/1974 | Ashworth |
| 3,905,449 A | 9/1975 | Uphoff |

(Continued)

OTHER PUBLICATIONS

Stanwade Metal Products, Inc., "15,000 Gallon Doublewall Beamskid", (1990), 1 page, Hartford, OH, US.

(Continued)

*Primary Examiner* — Robert A. Siconolfi
(74) *Attorney, Agent, or Firm* — Harness, Dickey & Pierce, P.L.C.

(57) ABSTRACT

A mobile vessel for refueling an engine or tank of a vehicle at a remote refueling site. A refueling station is mounted to the mobile vessel and includes a movable platform mounted to a generally horizontal deck. The platform is movable between a deployed position and a stowed position. In the deployed position the platform extends away from the deck to provide a floor for the worker to stand on to connect the fuel dispenser to the engine or tank. In the stowed position the movable platform is folded from the deployed position towards the generally horizontal deck.

24 Claims, 8 Drawing Sheets

(56) References Cited

U.S. PATENT DOCUMENTS

| | | |
|---|---|---|
| 3,960,389 A | 6/1976 | Narahari |
| 3,997,211 A | 12/1976 | Graves |
| 4,004,652 A | 1/1977 | Laboy-Alvarado |
| 4,236,601 A | 12/1980 | Naka |
| 4,522,441 A | 6/1985 | Allison |
| 4,589,565 A | 5/1986 | Spivey |
| 4,618,029 A | 10/1986 | Lowry |
| 4,787,111 A | 11/1988 | Pacek et al. |
| 4,936,407 A | 6/1990 | Brock et al. |
| 5,004,269 A | 4/1991 | Pelt |
| 5,033,582 A | 7/1991 | Hoben |
| 5,046,582 A | 9/1991 | Albrecht |
| 5,058,924 A | 10/1991 | Whatley, Jr. |
| 5,071,166 A | 12/1991 | Marino |
| 5,213,367 A | 5/1993 | Norman, Jr. et al. |
| 5,251,473 A | 10/1993 | Reese |
| 5,320,247 A | 6/1994 | Sharp |
| 5,392,878 A | 2/1995 | Bennett et al. |
| 5,564,588 A | 10/1996 | Reese |
| 5,601,204 A | 2/1997 | Hall |
| 6,012,545 A | 1/2000 | Faleide |
| 6,045,157 A | 4/2000 | Poulin |
| 6,068,277 A | 5/2000 | Magnussen |
| D442,520 S | 5/2001 | Wade |
| 6,250,345 B1 | 6/2001 | Allwein et al. |
| 6,279,955 B1 | 8/2001 | Fisher |
| 6,286,707 B1 | 9/2001 | Hall et al. |
| 6,375,222 B1 | 4/2002 | Wade |
| 6,390,325 B1 | 5/2002 | Gonzales |
| 6,431,093 B1 | 8/2002 | Hansen |
| 6,543,116 B1 | 4/2003 | Vermette et al. |
| 6,986,402 B2 | 1/2006 | Hedley et al. |
| 7,025,174 B1 | 4/2006 | Hawley |
| 7,140,467 B2 | 11/2006 | Cook |
| 7,216,741 B2 | 5/2007 | MacDonald et al. |
| D557,178 S | 12/2007 | Petzitillo, Jr. et al. |
| 7,469,915 B2 | 12/2008 | Horn et al. |
| 7,753,171 B2 | 7/2010 | Castagno et al. |
| 7,762,588 B2 | 7/2010 | Markham |
| 7,775,169 B2 | 8/2010 | Horn et al. |
| D637,114 S | 5/2011 | Ries |
| 8,113,314 B2 | 2/2012 | Kennedy |
| 8,113,315 B2 | 2/2012 | Farley et al. |
| 8,182,013 B1 | 5/2012 | Alvarado |
| 8,191,683 B2 | 6/2012 | Rathbone et al. |
| 8,250,992 B2 | 8/2012 | Swygert |
| 8,261,930 B2 | 9/2012 | Satterfield et al. |
| 8,328,040 B2 | 12/2012 | Ries |
| D678,127 S | 3/2013 | Markham |
| 8,397,869 B2 | 3/2013 | Tsutsumi et al. |
| 8,403,108 B2 | 3/2013 | Bliton et al. |
| 8,479,882 B2 | 7/2013 | DuBose et al. |
| 8,496,270 B2 | 7/2013 | Nothof et al. |
| 8,517,118 B2 | 8/2013 | Remoue |
| 8,523,233 B2 | 9/2013 | Markham |
| 8,590,921 B2 | 11/2013 | Benson et al. |
| 8,662,250 B2 | 3/2014 | Kennedy |
| 8,662,251 B2 | 3/2014 | Hansen |
| 8,668,048 B1 | 3/2014 | Morris |
| 8,678,411 B2 | 3/2014 | Kibler |
| 8,726,584 B1 | 5/2014 | Nolte et al. |
| 8,746,403 B1 | 6/2014 | Tyner et al. |
| 8,801,041 B2 | 8/2014 | Barrett et al. |
| 8,807,279 B2 | 8/2014 | Remoue |
| 8,893,853 B2 | 11/2014 | Kennedy |
| 9,133,014 B2 | 9/2015 | Kenan et al. |
| 9,283,883 B2 | 3/2016 | Vaughn |
| 9,308,869 B1 | 4/2016 | Owens, Jr. |
| 9,382,758 B2 | 7/2016 | Kennedy |
| 9,403,486 B2 | 8/2016 | May |
| 10,093,238 B2 | 10/2018 | Koga |
| 2002/0189503 A1 | 12/2002 | Hansen |
| 2003/0020253 A1 | 1/2003 | Albert Bosman et al. |
| 2004/0173406 A1 | 9/2004 | Lantz |
| 2006/0272896 A1 | 12/2006 | Rajewski |
| 2007/0181212 A1 | 8/2007 | Fell |
| 2009/0145692 A1 | 6/2009 | Flickinger et al. |
| 2009/0273174 A1* | 11/2009 | Markham .............. B60P 3/224 280/837 |
| 2010/0147622 A1 | 6/2010 | Fuqua et al. |
| 2012/0024629 A1 | 2/2012 | Berry, Jr. et al. |
| 2012/0025507 A1 | 2/2012 | Berry, Jr. et al. |
| 2012/0048648 A1 | 3/2012 | Meacham |
| 2012/0145480 A1 | 6/2012 | Willis et al. |
| 2012/0299283 A1 | 11/2012 | Harrell |
| 2013/0092474 A1 | 4/2013 | Magnussen |
| 2013/0153324 A1 | 6/2013 | Kissel, Jr. |
| 2014/0077484 A1 | 3/2014 | Harrell |
| 2014/0174851 A1 | 6/2014 | Kennedy |
| 2015/0115589 A1 | 4/2015 | Thiessen |
| 2015/0128880 A1 | 5/2015 | Hoffman |
| 2015/0224936 A1 | 8/2015 | Kichline, Jr. et al. |
| 2016/0108629 A1 | 4/2016 | Feinberg et al. |
| 2016/0138338 A1 | 5/2016 | Olson |
| 2017/0190293 A1 | 7/2017 | Koga |
| 2017/0313255 A1 | 11/2017 | Brett et al. |

OTHER PUBLICATIONS

Stanwade Metal Products, Inc., "20,000 Gallon Doublewall Beamskid", (1990) 1 page, Hartford, OH, US.

"Fueling Installation / Onside Fuel Storage", (2008), 1 page, Beard Oil, Mt. Pleasant, MI, US.

Baker EZ Clean Style Tank, as constructed by H&H Welding Co., at least as early as Feb. 24, 2009 (BEO0155; PF019; PF020; see generally Deposition of C. Holifield).

Defendant Portabull Fuel Service, LLC's Preliminary Invalidity Contentions filed in U.S. District Court, Southern District of Mississippi, Eastern Division Case No. 2:19-cv-00156-KS-MTP (18 pages).

Defendant Portabull Fuel Service, LLC's Preliminary Invalidity Contentions with exhibits filed in U.S. District Court, Southern District of Mississippi, Eastern Division Case No. 2:19-cv-00156-KS-MTP (113 pages).

Exhibit from Benko Products Deposition taken in U.S. District Court, Southern District of Mississippi, Eastern Division Case No. 2:19-cv-00156-KS-MTP; Green Access & Fall Protection Portable Transloading Unit (Web Archive Dec. 24, 2014).

Exhibit from Benko Products Deposition taken in U.S. District Court, Southern District of Mississippi, Eastern Division Case No. 2:19-cv-00156-KS-MTP; Green Access & Fall Protection Equipment Catalog 2012.

Exhibit from Benko Products Deposition taken in U.S. District Court, Southern District of Mississippi, Eastern Division Case No. 2:19-cv-00156-KS-MTP; All Green Access & Fall Protection Equipment Products (Web Archive Oct. 11, 2013).

Exhibit from Oct. 30, 2020 Deposition of Benjamin Gause, Jr. (of Modular Access Systems) taken in U.S. District Court, Southern District of Mississippi, Eastern Division Case No. 2:19-cv-00156-KS-MTP; Rack Framed Image (Web Archive 2006).

Exhibit from Oct. 30, 2020 Deposition of Benjamin Gause, Jr. (of Modular Access Systems) taken in U.S. District Court, Southern District of Mississippi, Eastern Division Case No. 2:19-cv-00156-KS-MTP; Modular Access Systems Mobile Platforms (Web Archive May 3, 2006).

Exhibit from Oct. 30, 2020 Deposition of Benjamin Gause, Jr. (of Modular Access Systems) taken in U.S. District Court, Southern District of Mississippi, Eastern Division Case No. 2:19-cv-00156-KS-MTP; Modular Access Systems Loading Arms (Web Archive Jul. 20, 2006).

Exhibit from Oct. 30, 2020 Deposition of Benjamin Gause, Jr. (of Modular Access Systems) taken in U.S. District Court, Southern District of Mississippi, Eastern Division Case No. 2:19-cv-00156-KS-MTP; Modular Access Systems Gangways, Access Bridges, Safety Stairs and Access Ramps for Bulk Loading (Web Archive Sep. 12, 2009).

Exhibit from Oct. 30, 2020 Deposition of Benjamin Gause, Jr. (of Modular Access Systems) taken in U.S. District Court, Southern

(56) References Cited

OTHER PUBLICATIONS

District of Mississippi, Eastern Division Case No. 2:19-cv-00156-KS-MTP; Modular Access Systems Gangways and Access Ramps (Web Archive May 3, 2006).
Exhibit from Jul. 31, 2020 Deposition of Theron James Kennedy. (of Wichita Tank Mfg., Ltd.) taken in U.S. District Court, Southern District of Mississippi, Eastern Division Case No. 2:19-cv-00156-KS-MTP; Wichita Tank Pictures (WayBack Machine Internet Archive Nov. 25, 2011).
Correspondence to Douglas A. Robinson (Harness, Dickey & Pierce, P.L.C.) from Benjamin E. Weed (K&L Gates LLP) dated Sep. 30, 2020.
Correspondence to Douglas A. Robinson (Harness, Dickey & Pierce P.L.C.) from Benjamin E. Weed (K&L Gates LLP) dated Aug. 17, 2020.
Correspondence to Benjamin E. Weed (K&L Gates LLP) from Douglas A. Robinson (Harness, Dickey & Pierce P.L.C.) dated Oct. 5, 2020.
Exhibit from Benko Products Deposition taken in U.S. District Court, Southern District of Mississippi, Eastern Division Case No. 2:19-cv-00156-KS-MTP; Green Access & Fall Protection Portable Transloading Platform.
Claim Construction Memorandum Opinion and Order dated Mar. 23, 2021 in United States Disctrict Court, Southern District of Mississippi, Eastern Division Civil Action No. 2:19-CV-156-KS-MTP.
Defendant Portabull Fuel Service, LLC's Amended Invalidity Contentions dated Jan. 5, 2021 in United States District Court, Southern District of Mississippi, Eastern Division, Case No. 2:19-cv-00156-KS-MTP.
Defendant Portabull Fuel Service, LLC's Second Amended Invalidity Contentions dated Apr. 29, 2021 in United States District Court, Southern District of Mississippi, Eastern Division, Case No. 2:19-cv-00156-KS-MTP.
Exhibit from Michael Bernard Corrigan's Deposition taken in U.S. District Court, Southern District of Mississippi, Eastern Division Case No. 2:19-cv-00156-KS-MTP; OPW Engineered Systems "Top Loading Arms" (circa 2014).
Exhibit from Michael Bernard Corrigan's Deposition taken in U.S. District Court, Southern District of Mississippi, Eastern Division Case No. 2:19-cv-00156-KS-MTP; OPW Engineered Systems "Bottom Loading Arms" (circa 2014).
Exhibit from Michael Bernard Corrigan's Deposition taken in U.S. District Court, Southern District of Mississippi, Eastern Division Case No. 2:19-cv-00156-KS-MTP; Corrigan refueling depot (circa 2014).
Exhibit from Michael Bernard Corrigan's Deposition taken in U.S. District Court, Southern District of Mississippi, Eastern Division Case No. 2:19-cv-00156-KS-MTP; line gangway sales brochure from Green Access & Fall Protection (circa 2014).
Exhibit from Michael Bernard Corrigan's Deposition taken in U.S. District Court, Southern District of Mississippi, Eastern Division Case No. 2:19-cv-00156-KS-MTP; photograph of tank (Exhibit 0005) (circa 2014).
Exhibit from Michael Bernard Corrigan's Deposition taken in U.S. District Court, Southern District of Mississippi, Eastern Division Case No. 2:19-cv-00156-KS-MTP; photograph of tank (Exhibit 0006) (circa 2014).
Correspondence to Douglas A. Robinson (Harness, Dickey & Pierce, P.L.C.) from Bejamin E. Weed (K&L Gates LLP) dated Sep. 30, 2020.
Correspondence to Douglas A. Robinson (Harness, Dickey & Pierce, P.L.C.) from Bejamin E. Weed (K&L Gates LLP) dated Aug. 17, 2020.

* cited by examiner

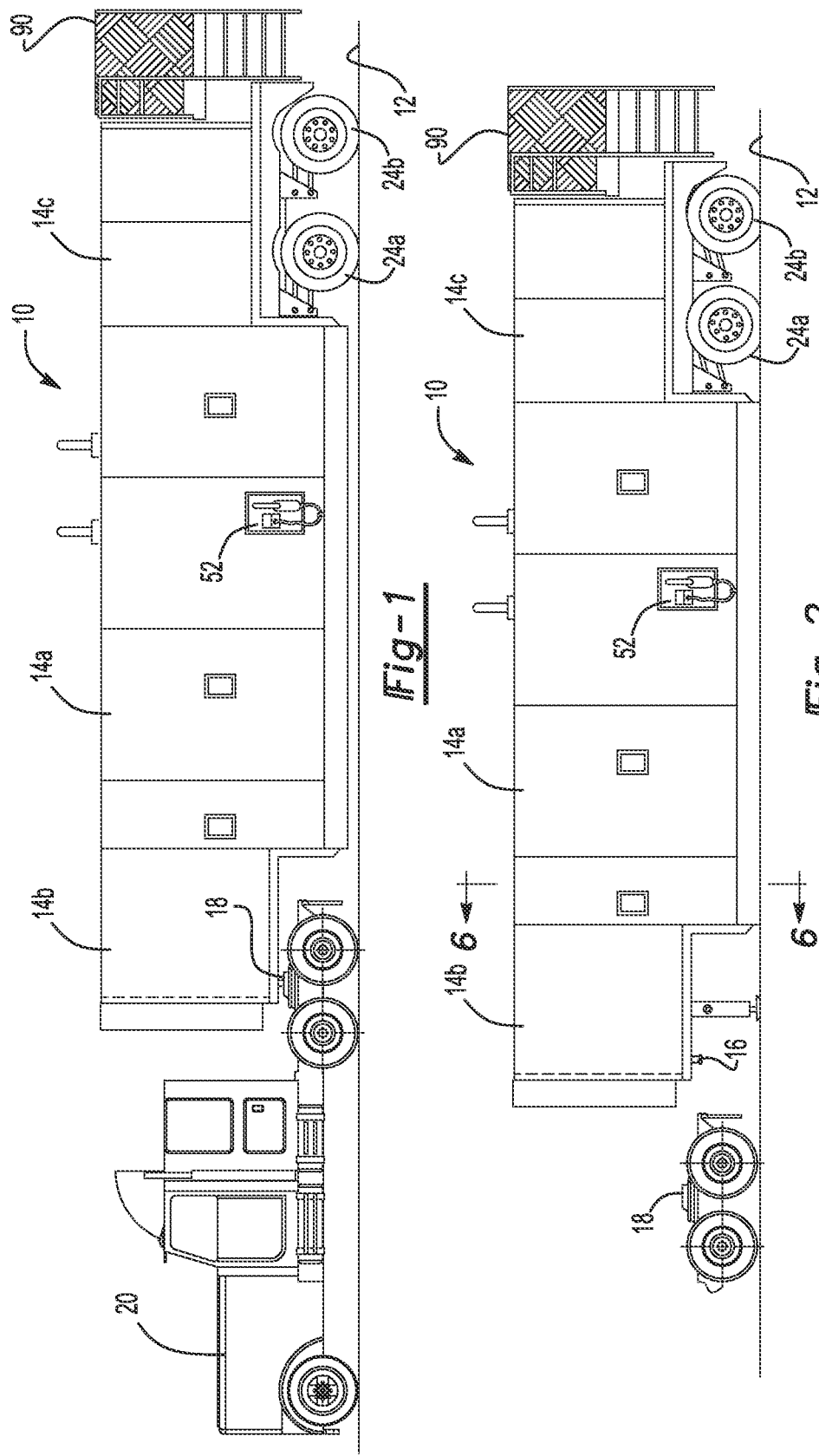

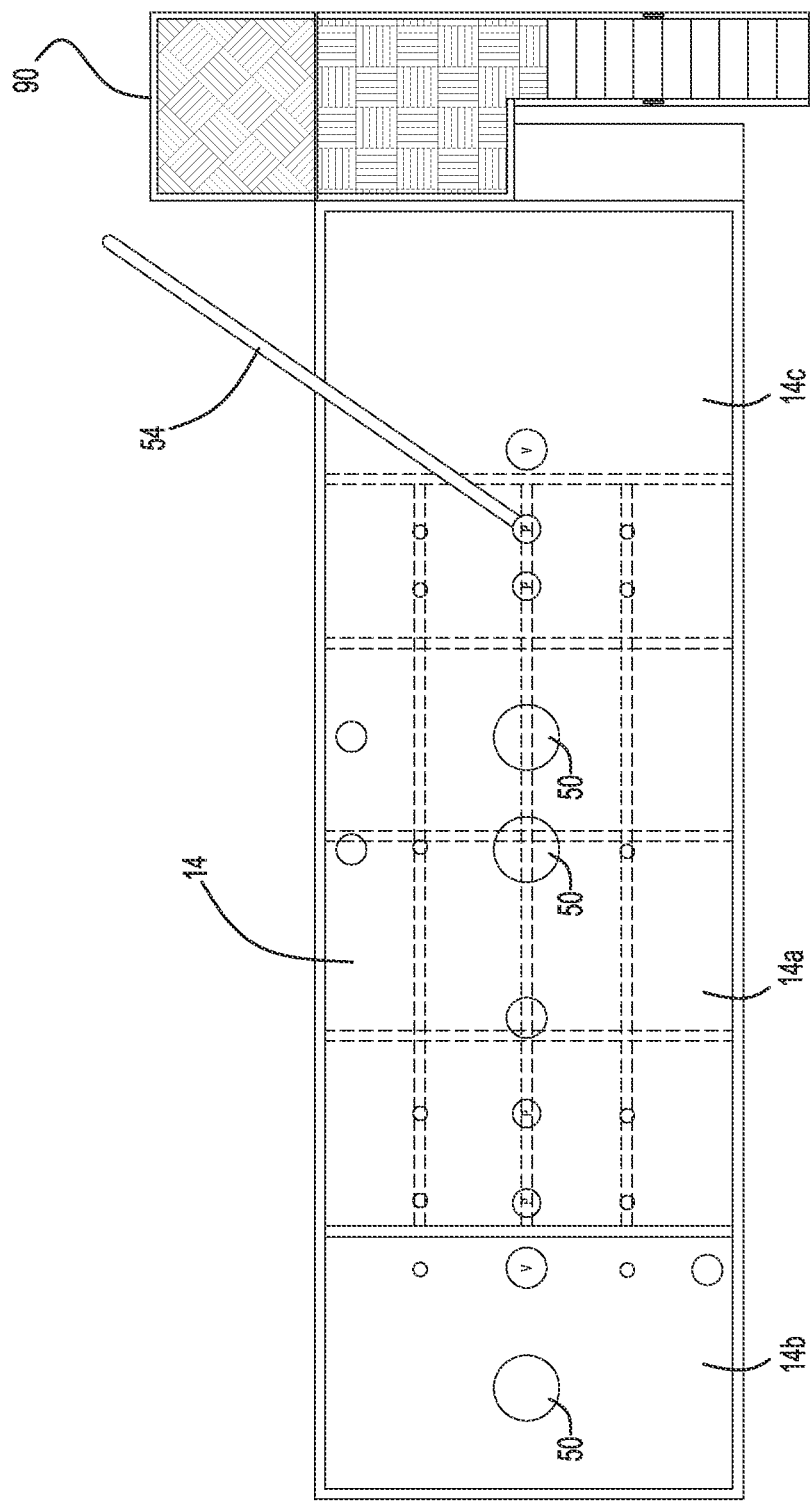

MOBILE REFUELING VESSEL

CROSS-REFERENCE TO RELATED APPLICATIONS

This patent application is a continuation patent application of U.S. patent application Ser. No. 16/356,467 filed Mar. 18, 2019 (U.S. Pat. No. 11,267,403), which is a continuation patent application of U.S. patent application Ser. No. 15/871,553 filed Jan. 15, 2018 (U.S. Pat. No. 10,232,782), which is a divisional patent application of U.S. patent application Ser. No. 14/629,889 filed Feb. 24, 2015 (U.S. Pat. No. 9,931,986). These patent applications are expressly incorporated by reference herein in their entirety.

FIELD

The present disclosure relates to fuel tanks and, more particularly, to a transportable fuel tank that may be used to refuel engines at remote locations such as construction sites and the like.

BACKGROUND

This section provides background information related to the present disclosure, which is not necessarily prior art.

In some instances, it is impractical for a vehicle to travel to a gas station or the like to be refueled. Construction sites are an example. These sites are often remotely located and employ numerous pieces of construction equipment such as trucks, bulldozers, and other vehicles having engines that need to be refueled periodically. Since it is not practical for these pieces of construction equipment to travel very far, it is preferable to bring a refueling option to the construction site so that the equipment can be refueled without having to travel very far.

One example of a typical refueling option is a single-walled spherical tank that contains fuel. Precautions are often mandated for ecological reasons to minimize contamination of the environment in the event of a leak in the tank. Typical of such precautions are berms and/or bladders that surround the tank to contain any fuel that may leak from the tank. Unfortunately, these precautions are expensive, are not easy to maintain, and may not totally be effective.

SUMMARY

This section provides a general summary of the disclosure, and is not a comprehensive disclosure of its full scope or all of its features.

The present disclosure includes a mobile vessel for refueling an engine or tank of a vehicle at a remote refueling site. A refueling station is mounted to the mobile vessel and includes a movable platform mounted to a generally horizontal deck. The platform is movable between a deployed position and a stowed position. In the deployed position the platform extends away from the deck to provide a floor for the worker to stand on to connect the fuel dispenser to the engine or tank. In the stowed position the movable platform is folded from the deployed position towards the generally horizontal deck.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of a mobile refueling vessel made in accordance with the teachings of the present invention, while being transported;

FIG. 2 is a side view of the vessel after having been lowered onto the ground at the refueling site;

FIG. 3 is a top view thereof;

Figure 6:
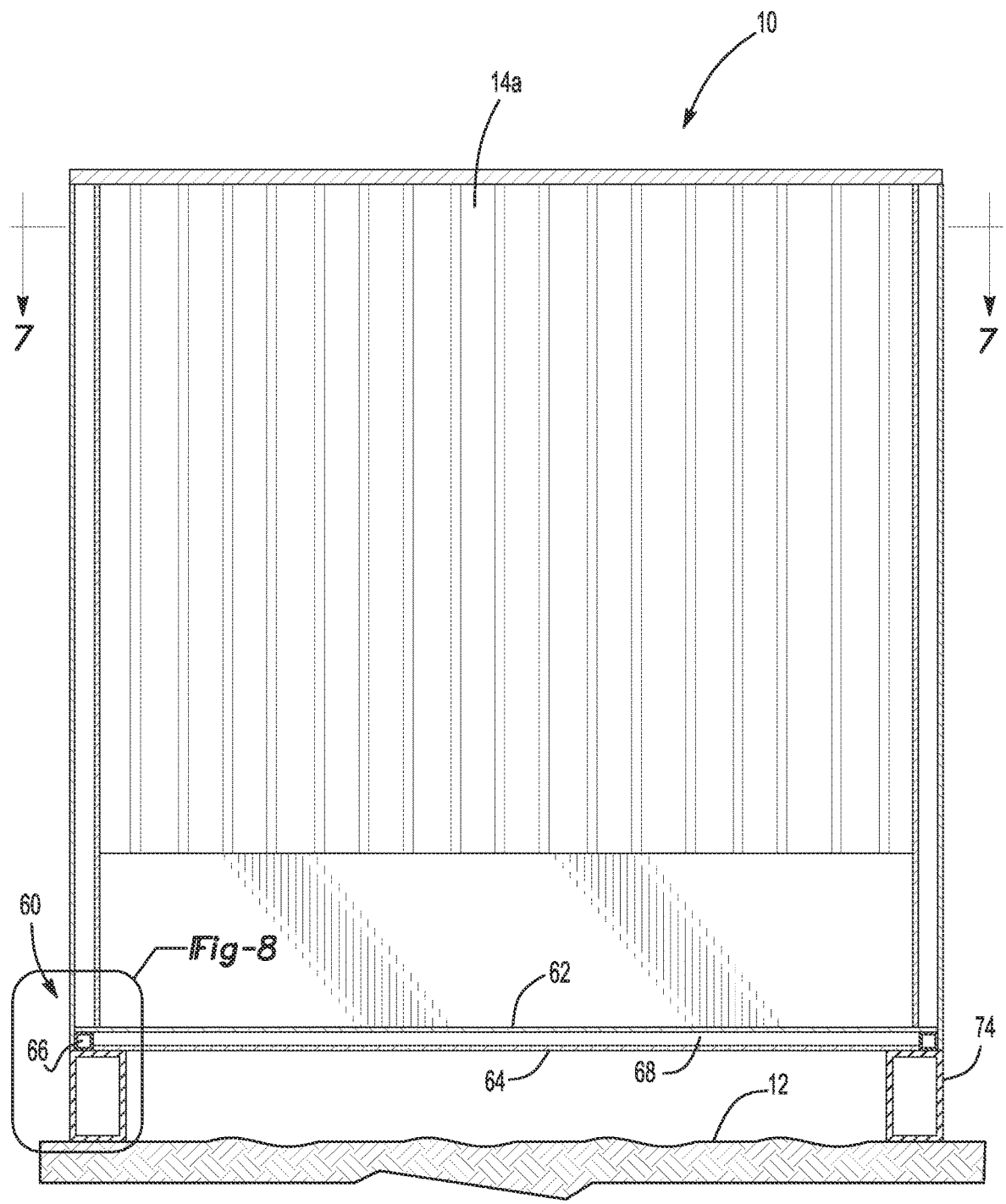
Figure 7:
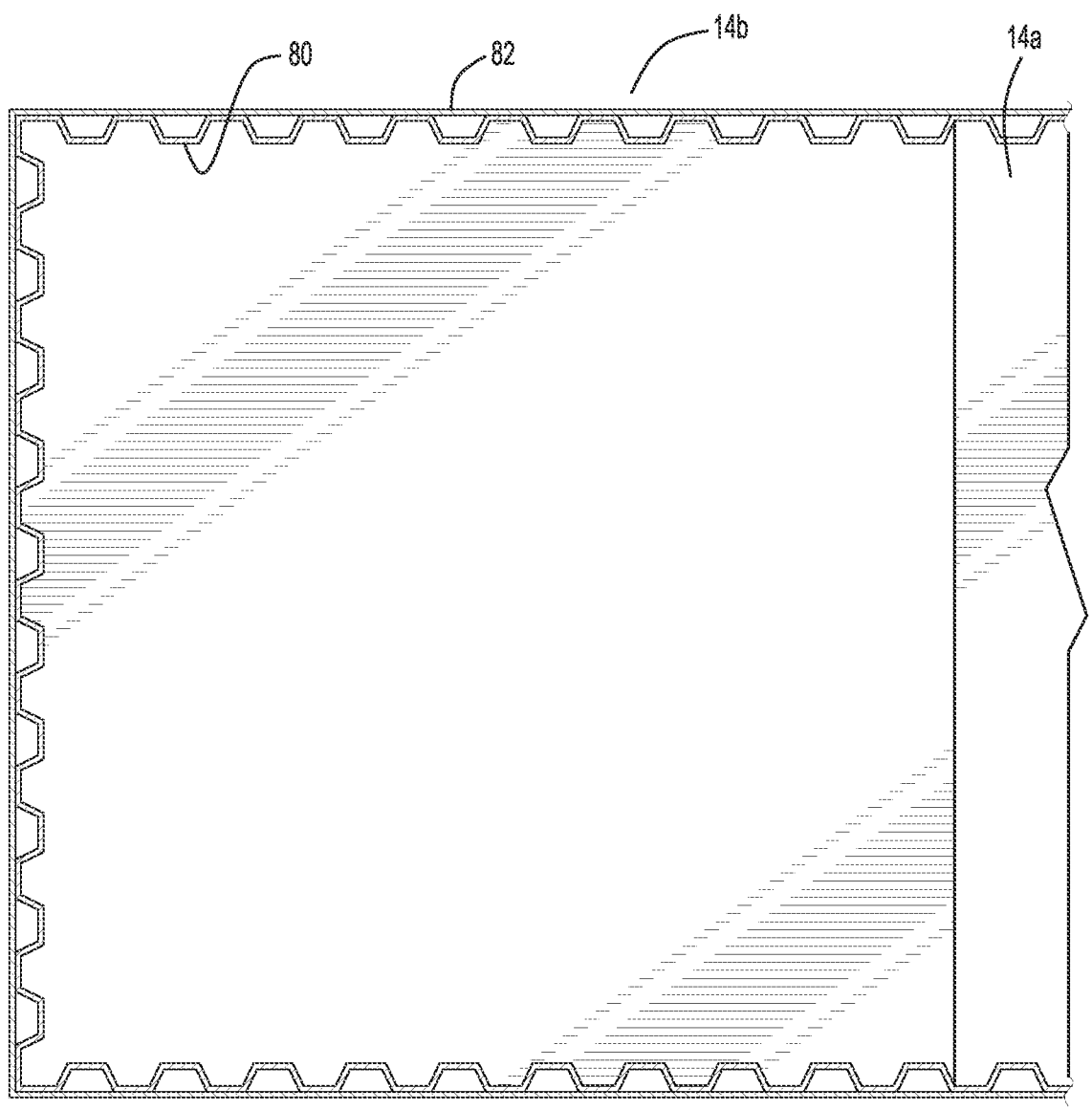
Figure 8:
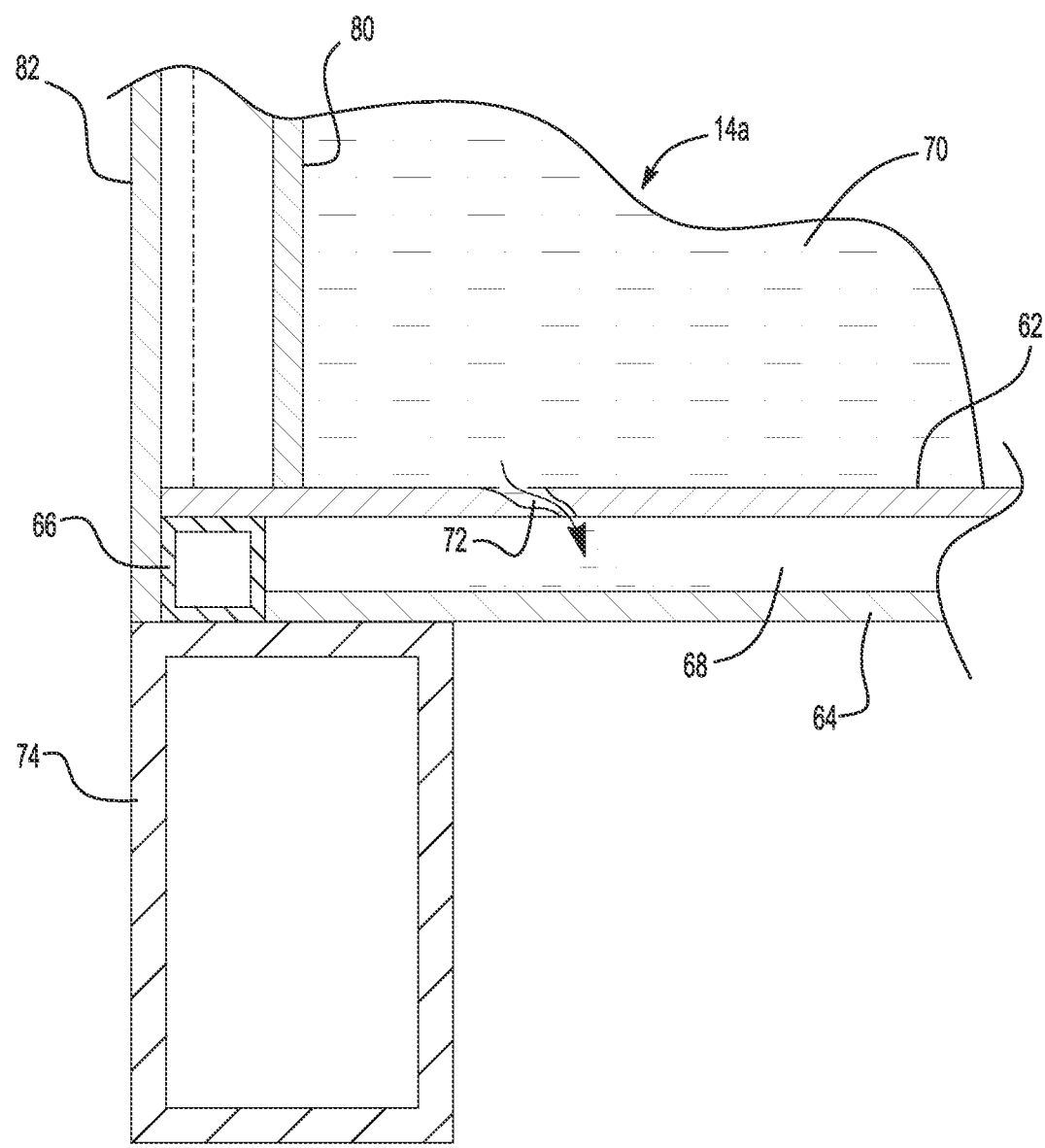
Figure 9:
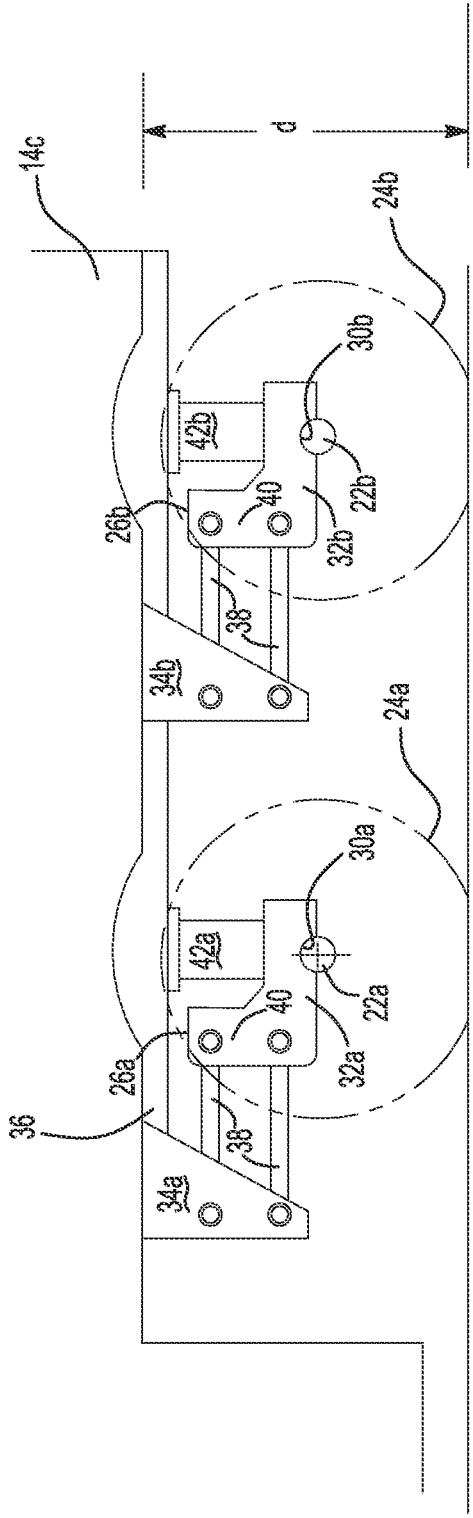
Figure 10:
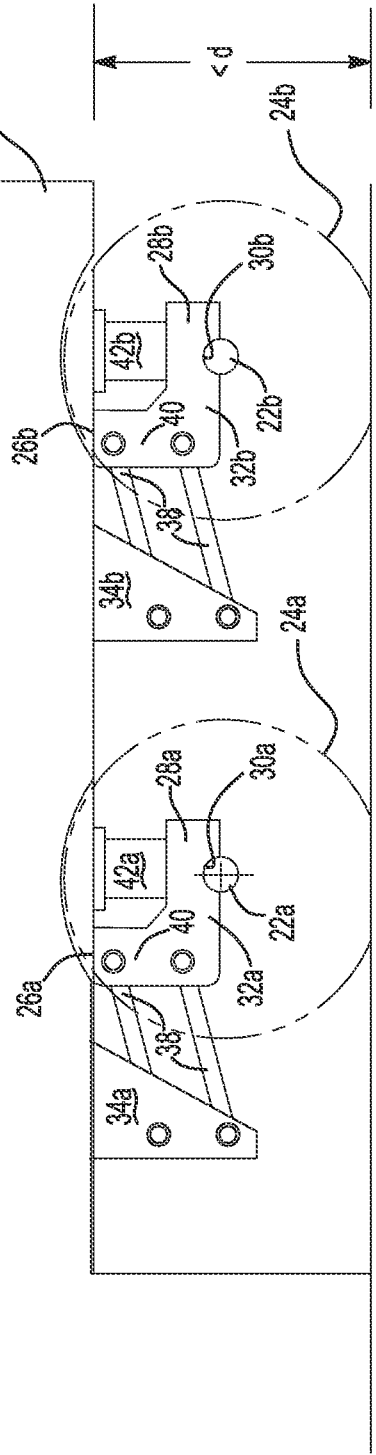

FIG. 6 a sectional view thereof taken along the lines of 6-6 of FIG. 2;

FIG. 7 is a sectional view thereof taken along the lines 7-7 of FIG. 6;

FIG. 8 is an enlarged partial cross-sectional view of the area labeled FIG-8 in FIG. 6;

FIG. 9 is a side view of suspension components when the vessel is raised ready for transportation; and FIG. 10 is a view, similar to FIG. 9, in which the suspension components have lowered the vessel onto the ground.

Corresponding reference numerals indicate corresponding parts throughout the several views of the drawings.

DETAILED DESCRIPTION

Example embodiments will now be described more fully with reference to the accompanying drawings.

Referring now to FIGS. 1 and 2, a mobile refueling vessel 10 is illustrated. In FIG. 1, the vessel 10 is shown in a transporting configuration, while FIG. 2 shows the vessel 10 lowered onto the ground 12 at a refueling site. The vessel includes a tank 14 with one or more sections that carry fuel. As can be seen perhaps better in FIG. 3, the tank 14 is generally rectangular in shape and has a central tank section 14a, a front gooseneck tank section 14b and a rear gooseneck tank section 14c. Optionally, each of the tanks 14a, 14b and 14c can be filled with different types of fuel.

Returning now to FIGS. 1 and 2, the front tank section 14b includes a coupling device 16 which is removably coupled to a mating coupling device 18 (also referred to herein as a trailer hitch) on a tractor/truck 20 for towing the vessel 10.

In FIG. 1, the vessel 10 is raised so that the tank 14a is off of the ground 12. The raising and lowering mechanism for the vessel 10 is best shown in FIGS. 9 and 10. In this embodiment, the vessel 10 includes two rear axles 22a and 22b carrying tires 24a and 24b, respectively. Suspension components 26a and 26b comprise an L-shape axle mount component 28a, 28b. Each axle mount suspension component has a recess 30a, 30b in a lower portion of a horizontally extending leg 32a, 32b for receiving the axles 22a, 22b. A bracket 34a, 34b is fixed at its upper end to a frame portion 36 of the vessel and extends downwardly. Links 38 have their one ends pivotably connected to the bracket 34. Opposite ends of the links 38 are pivotably connected to a vertically extending leg 40 of the suspension component 26. Airbags 42a, 42b operate on the suspension components 26a, 26b to raise and lower their respective axles 22a, 22b thereby, in turn, raising and lowering the vessel 10. The upper end of the airbags 42a, 42b are fixed to a frame member 36 whereas the lower portion of the airbags are connected to an upper portion of the suspension components 26a, 26b. When the airbags 42a, 42b are inflated (by a manually actuable device on the vessel), the airbags push downwardly on the suspension components 26a, 26b to raise the vessel 10 as shown in FIG. 9. In contrast, when the airbags are deflated, the axles 22a, 22b move upwardly thereby lowering the vessel 10 onto the ground 12 as shown in FIG. 10.

Returning now to FIG. 2 where vessel 10 is shown resting on the ground and the truck 20 has been disconnected from the vessel 10. In this position, the vessel 10 is ready to dispense fuel to engines of a variety of different vehicles. With additional reference to FIG. 3, various ports 50 are provided on the top of the vessel 10 to allow the tanks to be filled with fuel. The vessel is provided with one or more side dispenser mechanisms such as the illustrated typical hose and nozzle configuration 52 located on the side of the vessel. In the preferred embodiment, the vessel 10 further includes a boom 54 that can be guided by a user standing on a rear docking station as will be discussed in more detail in connection with FIG. 5.

The vessel 10, especially the tank section 14a that rests on the ground, is constructed so that potential leaks from the tank are collected to ensure that the leaking fuel does not drip onto the ground to contaminate the environment. With particular reference to FIGS. 6 and 8, the central tank section 14a of vessel 10 includes a bottom portion generally designated by the numeral 60. A first rectangular plate defines the inner wall 62 of bottom portion 60. Another, similarly sized, rectangular plate 64 is spaced from the inner wall 62. A peripheral frame constructed of square tubing 66 serves as a spacer element between the inner wall 62 and lower plate 64 to define a gap 68 therebetween for collecting fuel that may leak from the tank 14a. This is best shown in FIG. 8 wherein fuel 70 is shown leaking at 72 through a hole or puncture in the inner wall 62. Since the present invention prevents fuel from leaking onto the ground 12, the conventionally used berms or bladders are not necessary to collect any leaking fuel.

A lower main frame 74 in the bottom portion 60 may be provided to increase the strength of the vessel 10. The main frame 74 is preferably constructed of larger rectangular tubing. Upper portions of the tubing of frame 74 are connected to peripheral portions of the lower plate 64 whereas the lower portion of frame 74 rests on the ground and raises the lower plate 64 above ground level.

The sides of the vessel 10 are also preferably of a double walled construction. As seen best in FIG. 7, the inner walls of the sides are defined by a corrugated metal panel 80. Outer plates 82 are affixed to the inner panel 80 by welds or other suitable technique for securing the two metal members together.

Figure 4:
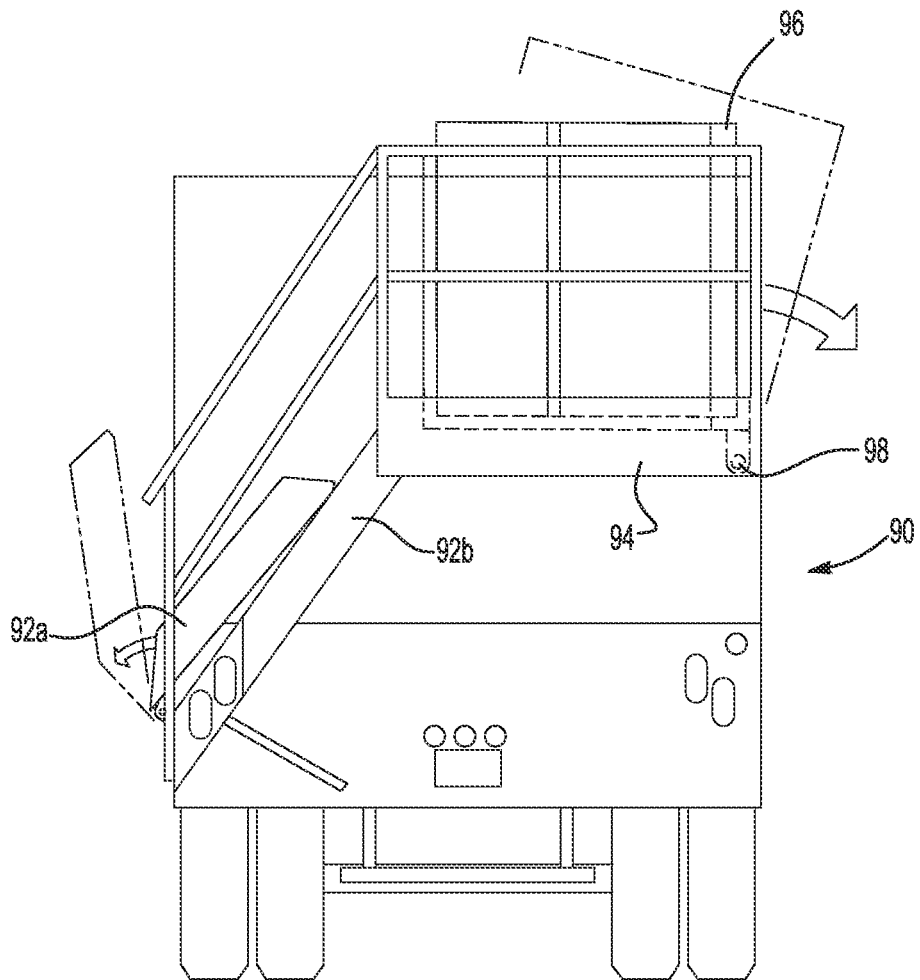
FIG. 4 is a rear view thereof showing a foldable docking station in its collapsed position.
Figure 5:
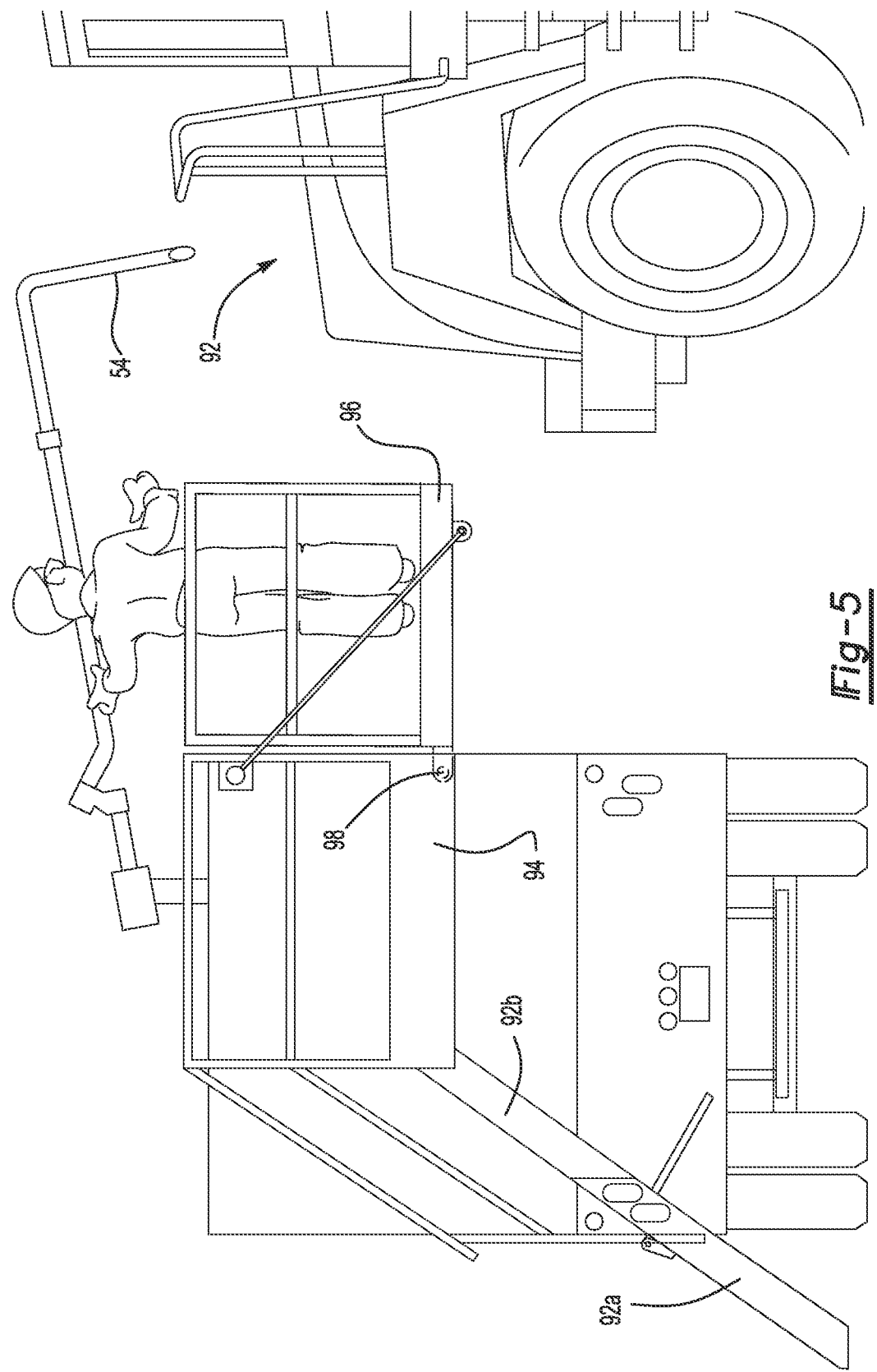
FIG. 5 is a rear view thereof showing the docking station in its extended position for refueling a vehicle.

In accordance with an aspect of this invention, a foldable docking station 90 is provided at the rear of the vessel 10. Referring to FIGS. 4 and 5, the docking station 90 (also referred to herein as a refueling workstation) is used by an operator to help refuel a vehicle 92 whose fuel inlet opening is at the top. FIG. 4 shows the docking station in its collapsed position. A ladder has two sections 92a and 92b pivotally connected together. The docking station 90 further includes a generally horizontal deck 94. A tiltable platform 96 is pivotally connected to deck 94 at pivot point 98. A suitable cable 100 is used to help secure the platform 96 in its extended position.

When in use, the ladder section 92a is folded outwardly towards the ground so that a user can climb onto the deck 94 and then onto platform 96 as shown in FIG. 5. Then, the operator can grasp a refueling boom 54 and swing it towards the vehicle fuel inlet opening to dispense fuel from the vessel 10 into the fuel tank of the vehicle 92.

When the vessel 10 is transported as shown in FIG. 1, the docking station 90 is folded into its collapsed position as best show in FIG. 4. There, the ladder section 92a is folded upwardly upon ladder section 92b. Similarly, the tiltable platform 96 is pivoted onto deck 94. In such manner, the foldable docking station 90 can be transported along with the rest of the vessel 10 more easily and present less wind resistance.

As will be appreciated the docking station 90 can be used separately on a wide variety of different refueling tanks and other vehicles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mobile fuel containment vessel for deployment at a remote worksite and configured to transport liquid fuel to the remote worksite, store the liquid fuel at the remote worksite and to enable a user of the mobile fuel containment vessel to dispense the liquid fuel at the remote worksite, the mobile fuel containment vessel comprising:
    a trailer comprising a chassis having at least one wheeled axle mounted to the chassis near a rear end of the chassis, and a vertical wall extending upward from the chassis;
    a fuel storage tank supported by the chassis, wherein the fuel storage tank comprises an access opening located at an upper side of the fuel storage tank through which the liquid fuel stored within the fuel storage tank can be withdrawn;
    a fuel dispenser in fluid communication with the fuel storage tank and configured to withdraw liquid fuel from the fuel storage tank, the fuel dispenser comprising a pivotal refueling boom configured to convey the liquid fuel withdrawn from the fuel storage tank to another fuel tank when dispensing the liquid fuel from the fuel storage tank;
    a refueling workstation attached to the trailer, the refueling workstation configured to provide the user of the mobile fuel containment vessel with access to the refueling boom, the refueling workstation comprising:
        a first deck attached to the vertical wall of the trailer, the first deck located at a first vertical height higher than the at least one wheeled axle and lower than the upper side of the fuel storage tank, the first deck configured to support the user of the mobile fuel containment vessel while accessing the fuel dispenser;
        a second deck pivotable relative to the first deck between a first deployed position and a first stowed position, wherein in the first deployed position the second deck is configured to support the user of the mobile fuel containment vessel while accessing the fuel dispenser, wherein in the first stowed position the second deck is raised relative to the first deployed position such that a distal end of the second deck is in a vertical plane above the first deck;
        a first ladder extending downward from the first deck; and
        a second ladder including a first end and a second end opposite to the first end, the second ladder is pivotable about the first end between a second deployed position and a second stowed position, wherein in the second deployed position the second end is below the first end, wherein in the second stowed position the second end is above the first end and at a vertical height above a bottom end of the first ladder.

2. The mobile fuel containment vessel of claim 1, further comprising:
    a first guard rail located about at least a portion of a perimeter of the first deck; and
    a second guard rail located about at least a portion of a perimeter of the second deck.

3. The mobile fuel containment vessel of claim 1, wherein the first ladder is fixed.

4. The mobile fuel containment vessel of claim 1, wherein the first ladder extends at an acute angle relative to a vertical axis.

5. The mobile fuel containment vessel of claim 1, wherein the first ladder extends downward from the first deck in a direction perpendicular to a length of the chassis.

6. The mobile fuel containment vessel of claim 1, wherein the mobile fuel containment vessel is movable between a raised transport configuration in which the mobile fuel containment vessel is spaced apart from a ground surface and a lowered refueling configuration in which the mobile fuel containment vessel rests directly on the ground surface;
    wherein in the raised transport configuration the second deck is in the first stowed position and the second ladder is in the second stowed position; and
    wherein in the lowered refueling configuration the second deck is in the first deployed position and the second ladder is in the second deployed position.

7. The mobile fuel containment vessel of claim 1, further comprising a plurality of fuel storage tanks; and
    wherein the fuel storage tank is a first one of the plurality of fuel storage tanks.

8. The mobile fuel containment vessel of claim 7, further comprising a side fuel dispenser for a second one of the plurality of fuel storage tanks, the side fuel dispenser accessible by the user while standing on a ground surface and without a need to access the refueling workstation.

9. A mobile refueling vessel comprising:
    a chassis;
    at least one axle mounted to the chassis;
    tires mounted to the at least one axle and configured to support the chassis over a ground surface;
    a fuel tank mounted to the chassis;
    a refueling boom in fluid communication with the fuel tank, the refueling boom including a proximal end and a distal end that is opposite to the proximal end;
    a refueling station at a rear of the mobile refueling platform, the refueling station including:
        a stationary deck elevated over the ground surface and arranged lower than the refueling boom;
        a platform mounted to the stationary deck, the platform is pivotable between a deployed platform position and a stowed platform position, in the deployed platform position the platform extends away from, and is generally parallel to, the stationary deck, in the stowed platform position the platform is raised relative to the deployed platform position;
an upper stair extending from the stationary deck; and
a lower stair pivotable between a deployed stair position and a stowed stair position, in the deployed stair position the lower stair extends downward towards the ground surface that the mobile refueling vessel is on, in the stowed stair position the lower stair is raised relative to the deployed stair position.

10. The mobile refueling vessel of claim 9, wherein the fuel tank includes a port at a top of the fuel tank, the refueling boom is in fluid communication with the port; and wherein the stationary deck is horizontal.

11. The mobile refueling vessel of claim 9, wherein the platform is pivotable about an axis extending parallel to an edge of the stationary deck.

12. The mobile refueling vessel of claim 9, wherein the upper stair extends from the stationary deck in a direction perpendicular to a length of the fuel tank.

13. The mobile refueling vessel of claim 9, wherein the platform, the stationary deck, and the upper stair each include a guardrail.

14. The mobile refueling vessel of claim 9, wherein the refueling station is connected to a rear of the fuel tank.

15. The mobile refueling vessel of claim 9, wherein the mobile refueling vessel has a raised transport configuration in which the mobile refueling vessel is spaced apart from the ground surface and a lowered refueling configuration in which the mobile refueling vessel is seated on the ground surface;
wherein in the raised transport configuration the platform is in the stowed platform position and the lower stair is in the stowed stair position; and
wherein in the lowered refueling configuration the platform is in the deployed platform position and the lower stair is in the deployed stair position.

16. The mobile refueling vessel of claim 15, further comprising a suspension configured to raise the fuel tank and the chassis to the raised transport configuration and lower the fuel tank and the chassis to the lowered refueling configuration.

17. The mobile refueling vessel of claim 9, wherein the fuel tank includes multiple, independent sub-fuel tanks.

18. The mobile refueling vessel of claim 9, wherein the fuel tank is rectangular; and
wherein the fuel tank includes a central tank section, a front gooseneck tank section, and a rear gooseneck tank section, each of which are independent and configured to store different types of fuel.

19. The mobile refueling vessel of claim 9, wherein the mobile refueling vessel includes a coupling device configured for connection to a mating coupling device on a tractor or truck for towing the mobile refueling vessel.

20. The mobile refueling vessel of claim 9, further comprising at least one side fuel dispenser.

21. The mobile refueling vessel of claim 9, wherein the fuel tank includes a sidewall with two layers.

22. A mobile refueling vessel configured to be transported from a first location to a second location including a refueling site, the mobile refueling vessel comprising:
a semi-trailer extending along a longitudinal axis and having a front end and a rear end, the semi-trailer comprising a wheeled chassis including at least one axle mounted near the rear end, a plurality of wheels mounted to the at least one axle, and a trailer hitch configured to removably couple the mobile refueling vessel to a tractor unit;
a fuel tank mounted to the wheeled chassis;
a port at a top of the fuel tank;
a refueling boom connected to the port, the refueling boom including a proximal end and a distal end that is opposite to the proximal end;
a refueling station at the rear end or the front end of the semi-trailer, the refueling station including:
a deck at a higher elevation than the wheeled chassis and at a lower elevation than both the refueling boom and the port, the deck is stationary and horizontal;
a pivotable platform mounted to the deck, the pivotable platform includes a guardrail and is pivotable about an axis extending parallel to an edge of the deck between a deployed platform position and a stowed platform position, wherein in the deployed platform position the pivotable platform extends away from, and is generally parallel to, the deck, wherein in the stowed platform position the pivotable platform is raised relative to the deployed position;
an upper stair extending from the deck in a direction perpendicular to a length of the mobile refueling vessel; and
a lower stair arranged lower than the upper stair and pivotable between a deployed stair position and a stowed stair position, in the deployed stair position the lower stair extends downward towards a ground surface that the mobile refueling vessel is on, in the stowed stair position the lower stair is raised relative to the deployed stair position.

23. The mobile refueling vessel of claim 22, further comprising a suspension configured to move the mobile refueling vessel between a raised transport configuration in which the mobile refueling vessel is spaced apart from the ground surface and a lowered refueling configuration in which the mobile refueling vessel rests on the ground surface at a refueling site;
wherein in the raised transport configuration the pivotable platform is in the stowed platform position and the lower stair is in the stowed stair position; and
wherein in the lowered refueling configuration the pivotable platform is in the deployed platform position and the lower stair is in the deployed stair position.

24. The mobile refueling vessel of claim 22, further comprising at least one side fuel dispenser.

* * * * *